US005716190A

United States Patent [19]

Rathert

[11] Patent Number: 5,716,190

[45] Date of Patent: Feb. 10, 1998

[54] TRANSPORT PROCESS AND APPARATUS FOR USE IN BOOKBINDING

[75] Inventor: Horst Rathert, Minden, Germany

[73] Assignee: Kolbus GmbH & Co. KG, Rahden, Germany

[21] Appl. No.: 584,559

[22] Filed: Jan. 11, 1996

[30] Foreign Application Priority Data

Jan. 11, 1995 [DE] Germany .......................... 195 00 560.0

[51] Int. Cl.$^6$ .......................... B65G 57/14

[52] U.S. Cl. .......................... 414/794.3; 271/204; 271/300; 414/793.6; 414/794.2; 270/52.14

[58] Field of Search .......................... 414/792.9, 793.5, 414/793.6, 794.2, 794.3; 271/264, 287, 298, 299, 300; 270/52.14

[56] References Cited

U.S. PATENT DOCUMENTS

| | | | |
|---|---|---|---|
| 3,687,447 | 8/1972 | Mundus | 414/793.5 X |
| 4,953,847 | 9/1990 | Honegger | 271/277 |
| 5,080,337 | 1/1992 | Mayer et al. | 270/1.1 |
| 5,492,444 | 2/1996 | Terry | 414/794.2 X |

FOREIGN PATENT DOCUMENTS

| | | | |
|---|---|---|---|
| 0 062 785 | 10/1982 | European Pat. Off. . | |
| 1 153 383 | 8/1963 | Germany . | |
| 1280651 | 10/1968 | Germany | 414/793.5 |
| 29 22 450 | 1/1980 | Germany . | |
| 0 059 746 B1 | 9/1982 | Germany . | |
| 3221001 A1 | 12/1982 | Germany . | |

*Primary Examiner*—Janice L. Krizek
*Attorney, Agent, or Firm*—Alix, Yale & Ristas, LLP

[57] ABSTRACT

Continuously accumulating printing works products are transported, over a comparatively long distance in a manner which consumes minimum manufacturing facility floor space, by being serially fed to clock-pulse controlled grippers of a continuously driven conveyor. The grippers grasp the products in the area of their leading edges and subsequently transport the products in tile-formation over a defined distance to delivery apparatus.

15 Claims, 3 Drawing Sheets

TRANSPORT PROCESS AND APPARATUS FOR USE IN BOOKBINDING

BACKGROUND OF THE INVENTION

1. Field of the Invention

The present invention relates to the manufacture of books and, particularly, to the movement of printed matter between work stations of a bookbinding system. More specifically, this invention is directed to apparatus for receiving continuously supplied printed material and delivering that material for further processing after a time delay and, especially, to a volumetrically efficient transport which accumulates printed matter such as folded printed sheets, partial or complete book blocks, brochures and the like. Accordingly, the general objects of the present invention are to provide novel and improved methods and apparatus of such character.

2. Description of the Prior Art

In the manufacture of a book, printed material moves from work station to work station as the requisite processing steps are performed. By way of example, partial or complete book blocks discharged from an adhesive binding machine will be transported to one or more trimming stations where the three unglued sides of the blocks will be sized and shaped, each trimming station typically comprising a three-knife trimmer. The adhesive binding machine and the three-knife trimmer(s) will be connected together by conveyor belts. Since it is necessary that the adhesive be given sufficient time to adequately set before the trimming operation is performed, the transport sections between an adhesive binding machine and the downstream trimming station (s) must be relatively long. These long transportation distances necessarily require a great amount of floor space in the manufacturing facility and the conveyors are generally constructed in such a manner as to hinder the access of operating personnel to the apparatus at the upstream and downstream ends of the conveyor and to the "work" being conveyed. Further, since space limitations customarily dictate that the conveyors not be linear, there is an inherent risk that the work being transported will be torn or otherwise damaged in the transitions between straight and curved conveyor sections.

A problem similar to that briefly discussed above is also presented by the transport of partial book blocks from an assembly station to plural stitching machines. It is common to employ plural automatic book thread-stitching machines which are coupled to a single assembly machine. The coupling is accomplished by means of a fixed tray conveyor system with cassettes for receiving the product to be sewn. Such fixed tray conveyor belt systems commonly take the form of an overhead conveyor and thus require lifting mechanisms associated with each thread-stitching machine. Such fixed tray conveyor belt systems are notoriously expensive.

A transport system for use in the in-line manufacture of books should optimally be able to move folded printed sheets lying loosely on top of one another, i.e., stacks of sheets or partial book blocks, between work stations. Such stacks have a notorious tendency to become misaligned due to sliding between the adjacent printed sheets. The above-briefly described prior art fixed tray conveyor belt systems experience difficulty in maintaining stack alignment during loading and unloading of the cassettes.

SUMMARY OF THE INVENTION

The present invention overcomes the above-briefly discussed and other deficiencies and disadvantages of the prior art by implementation of a novel and improved process for transporting continuously supplied printed products, such as folded printed sheets, book blocks, brochures, newspapers, and the like, individually or in stacks, between work stations of a book binding system. In accomplishing this unique process, the invention also provides a transport system particularly well-suited for use in the in-line production of books.

In accordance with the present invention, printed products discharged from an upstream work station are delivered to clock-pulse controlled grippers of a continuously moving "fixed tray" conveyor. The incoming printed products are acquired by being grasped in the area of their leading edge in the direction of travel, preferably on the head or foot of the product, and are subsequently transported in an overlapping formation over a defined delivery distance. The thus transported printed products are ejected from the conveyor in such a manner as to be presented at the input to the downstream work station(s).

A transport system in accordance with the invention includes an input section having a transfer device for synchronizing the movement of the in-coming printed products with the movement of the continuously driven conveyor. The transport system also includes a discharge section having a delivery device interpositioned between the conveyor and each of the downstream bookbinding machines to which the conveyed products are to be delivered. The conveyor and delivery device(s) cooperate to discharge, from the transport system, printed products which are supported so as to lie flat, i.e., the individual pages define parallel planes. Accordingly, the transport system of the present invention has the unique ability to accumulate aligned stacks of products immediately upstream of the downstream work station to which the products are being delivered.

The present invention also has the ability to hold together and transport printed products such as folded printed sheets, book blocks, brochures, newspapers and the like. In so doing, the in-line transport allows the closest possible spacing between the upstream and downstream work stations while at the same time permitting the printed products to be moved over a relatively long distance in traveling between the work stations. Because the products being transported are firmly gripped, undesired relative movement between the products or within the products during transport is prevented. A transport in accordance with the present invention, in fact, allows an arbitrarily expandable conveyor path. The invention thus allows a transit time adequate, for example, to dry and cool freshly glued products.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several figures and in which.

DESCRIPTION OF THE DISCLOSED EMBODIMENT

Figure 1:
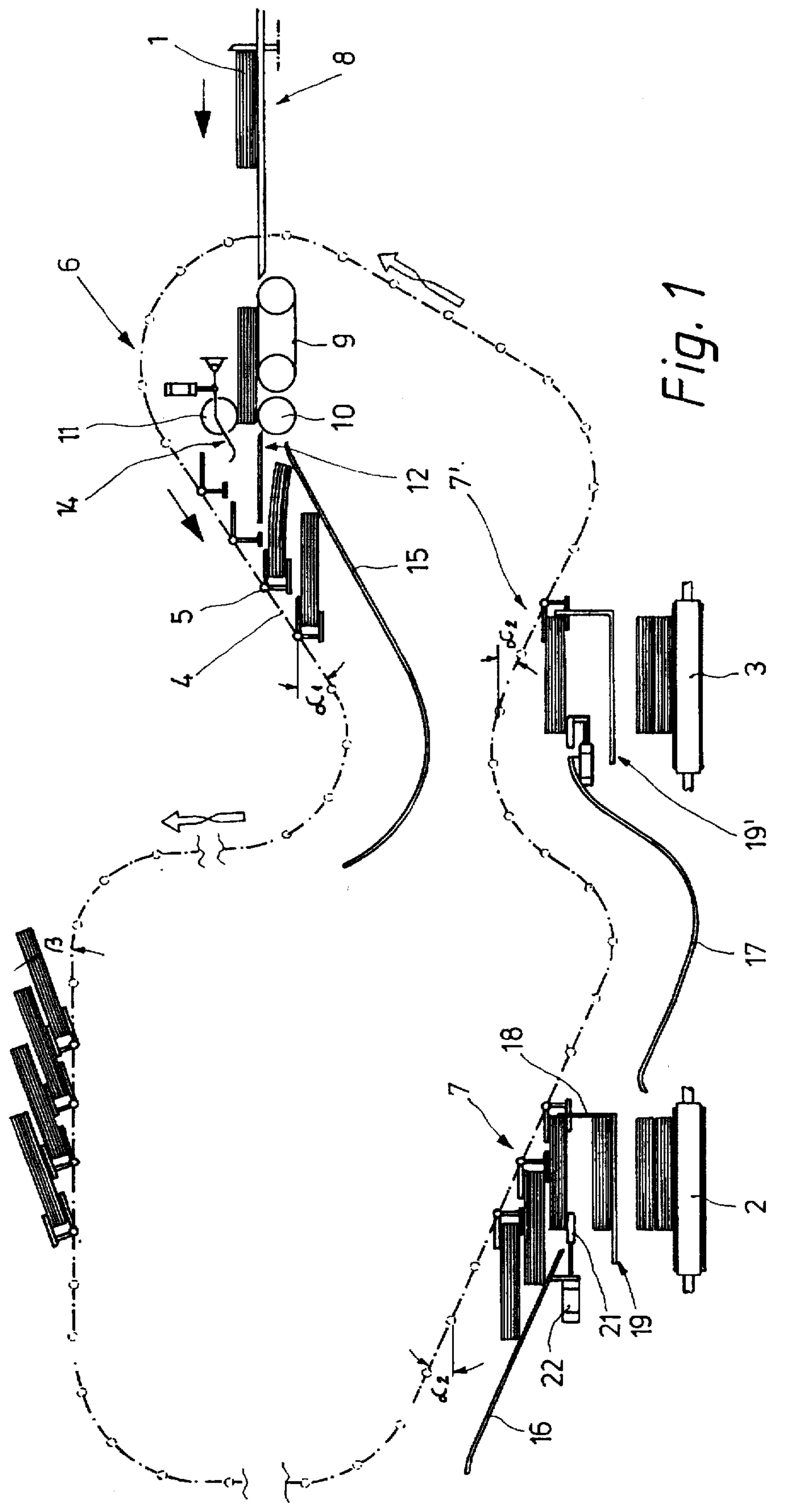
FIG. 1 is a schematic, side elevation view of a transport system in accordance with the present invention.

For illustrative purposes, FIG. 1 depicts the present invention in the environment of an incline bookbinding system and, particularly, interposed between an adhesive binding machine and a pair of automatic three-knife trimmers. The outfeed conveyor of the adhesive binding machine has been indicated generally at 8. The in-feed or supply belts for the three-knife trimmers are indicated respectively at 2 and 3. The printed products discharged from the adhesive binding machine on conveyor 8, which are represented in FIGS. 1 and 4 as book blocks 1, are transferred to and subsequently transported on a "fixed tray" conveyor which includes plural gripping mechanisms 5. The "grippers" 5 are continuously driven about the transport path by means of a chain drive 4. Fixed tray conveyors, which employ chain driven grippers, are known in the art and thus the operation of the grippers 5 will not be described in detail herein. For the purpose of distributing, drying and cooling the book blocks 1 received from the adhesive binding machine, the fixed tray conveyor is arranged as an overhead type conveyor. The grippers 5 acquire, i.e., grasp, each book block 1 in the area of its leading edge which is preferably either the head or the foot of the book block. The transfer of the book blocks 1 from the outfeed conveyor 8 to the fixed tray conveyor is accomplished by means of a transfer device which has been indicated generally at 6. The ejection of the dried and cooled book blocks 1 from the fixed tray conveyor, and the transfer thereof to the feed belts 2, 3 of the three-knife trimmers, is achieved by delivery devices indicated generally at 7 and 7'. The construction and operation of the transfer device 6 and delivery devices 7, 7' will be described below.

Figure 2:
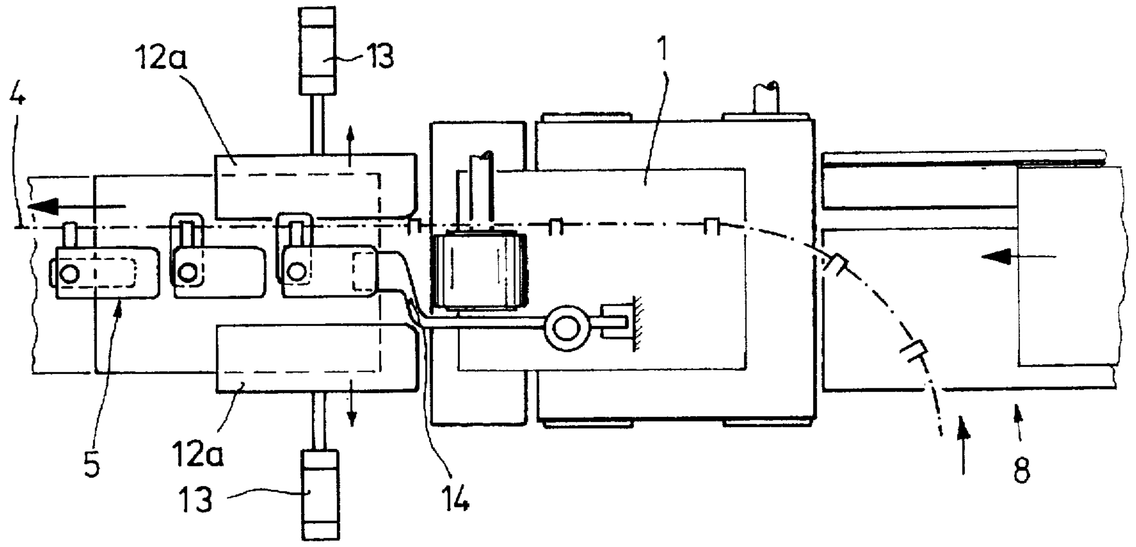
FIG. 2 is a top plan view, on an enlarged scale, of an input section transfer device for use in the transport system of FIG. 1.

Referring now simultaneously to FIGS. 1, 2 and 4, the input transfer device 6 is located in a section of the fixed tray conveyor where the grippers 5 are moving obliquely downward. Accordingly, almost immediately after being acquired by a gripper 5, the incoming product 1 is moved out of the working area of the transfer device 6, i.e., the cycle time of the transfer device 6 is very short.

The book blocks 1 are delivered to the transfer device 6 by the discharge conveyor 8 lying flat, i.e., the pages of the book block are in parallel planes and, preferably, these planes are horizontally oriented. The book blocks 1 are supplied with a specific constant separation. The operation of the grippers 5 is clock-pulse controlled, i.e., the lower jaws of the grippers are operated in the known manner in synchronism with the supply of book blocks. The swiveling motion of the lower gripper jaws may be most clearly seen from the schematic illustration of FIG. 4.

As noted above, the drive chain 4 of the fixed tray conveyor is continuously driven and the book blocks 1 are fed into the transfer device 6 at a uniform rate. Accordingly, the motion of the book blocks 1 must be arrested so that synchronization will be achieved between the moving book blocks 1 and the moving grippers 5. The closing of the grippers 5 takes place during this brief synchronization.

The transfer device 6 includes an intermediate conveyor belt 9 and a pair of cooperating rollers 10, 11. The conveyor belt 9 is driven synchronously with the outfeed conveyor 8 which supplies the product thereto while the rollers 10, 11 are driven intermittently and delay the product 1 in order to achieve the requisite synchronization with the grippers 5.

The book blocks 1 are supported, at the time of acquisition by the grippers 5, on a support plate indicated generally at 12 in FIGS. 1 and 4. As may be seen from FIG. 2, the support plate 12 is defined by a pair of reciprocally movable plate sections 12a which are operatively connected to associated fluidic actuators 13. The closing of a gripper 5 produces a signal which causes the actuators 13 to open the gap between the plate sections 12a making possible the downward motion of the block 1 grasped by a gripper 5. This downward motion is at an angle $\alpha_1$ with respect to horizontal. A sensor, in the form of a hold-down member indicated generally at 14, detects when a product 1 has dropped downwardly, as shown in FIG. 4c, as a consequence of the plate sections 12a moving apart under the action of actuators 13. The output signal of this sensor is employed as a control input which ensures that the plate sections 12a resume their initial position, as depicted in FIG. 2, as quickly as possible.

The book blocks 1, after acquisition by respective grippers 5, are transported obliquely downward. During this movement, the edge of the book block disposed opposite to the clamped edge is supported on a guide rail 15. Accordingly, during this initial oblique downward movement, the orientation of the block 1 at the time it was received in the transfer device 6 is generally maintained.

The direction of motion of the fixed tray conveyor, at the end of the downward motion at angle $\alpha_1$, translates to vertical upward movement. Subsequently, at the point of maximum height, the direction of motion again changes and the transport of the printed products 1 continues with the products being overlapped and inclined at an angle $\beta$ with respect to horizontal. During this movement on the overhead portion of the conveyor path, the products 1 will be in a mutually supporting relationship as shown.

After passing through a vertically downward-directed conveyor section, the transported printed products 1 reach the delivery device 7 of a first trimmer station, i.e., the trimmer station associated with in-feed conveyor 2. The path of the fixed tray conveyor is adjusted such that, in the region of the delivery device 7, the book blocks are moving obliquely downwardly at an angle $\alpha_2$ with respect to horizontal with their trailing edges, in the transport direction, being supported on a guide rail 16. Upon reaching the "storage" position within delivery device 7, in response to a signal generated by a position sensor, the gripper 5 will be caused to open and continued forward motion of the product 1 along the conveyor path will be blocked by motion arresting elements 18. The book block will thus be stripped, i.e., ejected, from the gripper 5. As will be described in greater detail below, particularly in connection with the discussion of FIG. 3, a book block 1 will be supported on an intermediate support indicated generally at 19 when separated from the continuously moving gripper 5.

Figure 3:
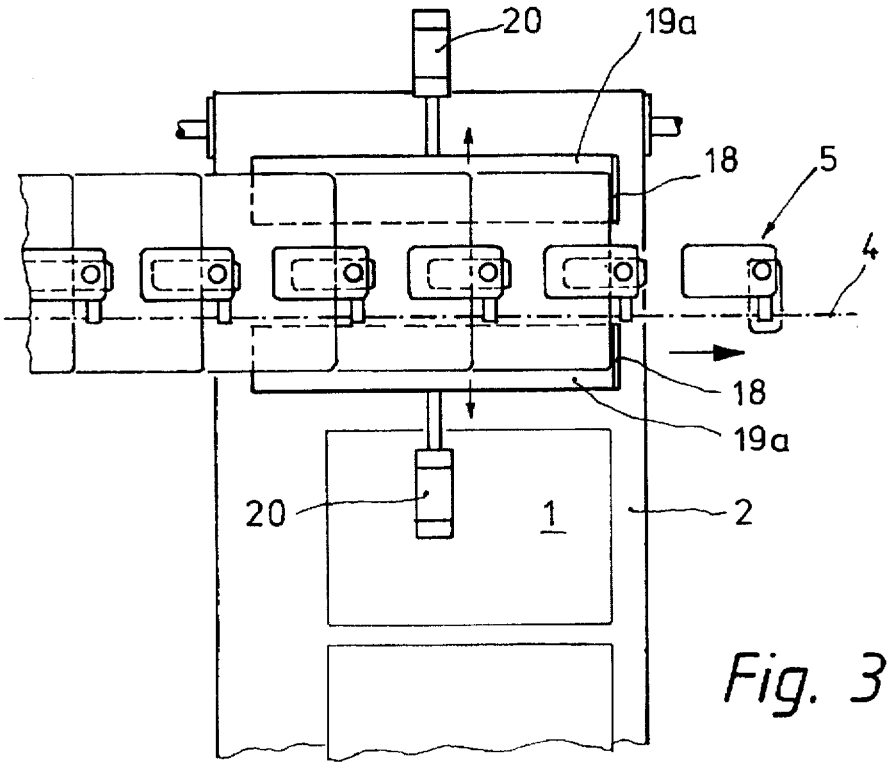
FIG. 3 is a top plan view, on an enlarged scale, of an output delivery apparatus for use with the transport system of FIG. 1.
Figure 4A:
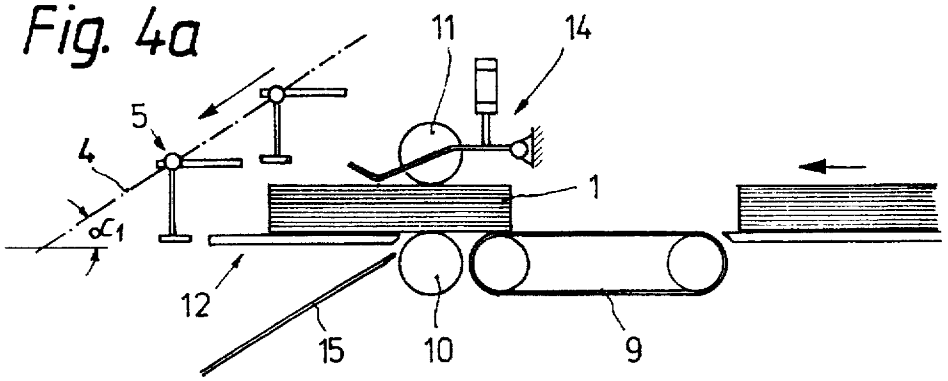
FIGS. 4*a*–4*d* are schematic side elevation views which illustrate the operation of the transfer device of FIG. 2.
Figure 4B:
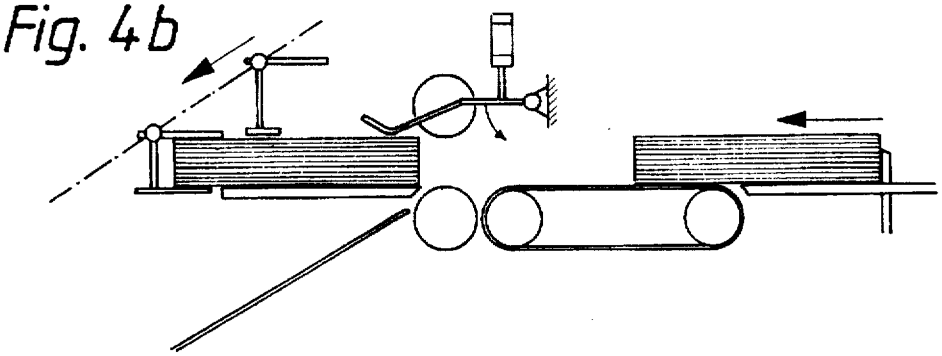
Figure 4C:
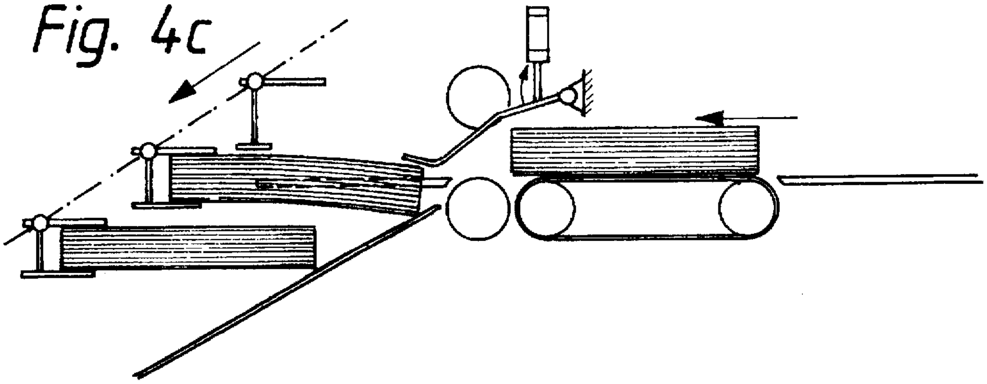
Figure 4D:
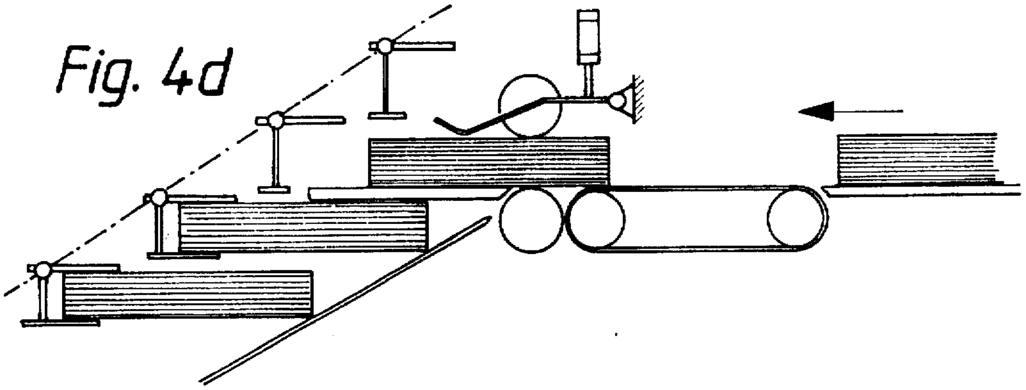

Referring to FIG. 3, the intermediate support 19 comprises a pair of support plate sections 19a. These support plate sections, like the plate sections 12a of the transfer device, are reciprocally moveable under the influence of fluidic actuators 20. The plate sections 19a support a book block from below along a pair of opposite side edges thereof. The support plate sections 19a are integral with the arresting elements 18. The plate sections 19a, the actuators 20 and the arresting elements 18 are vertically movable as a unit. Accordingly, a book block 1 separated from transport may be lowered to the in-feed conveyor 2 and, in fact, the delivery device 7 may be employed to form a stack of book blocks 1 on the conveyor 2. As will be obvious, upon lowering of a book block 1 to the top of a stack on conveyor 2, the plate sections 19a will be moved outwardly under the influence of the actuators 20 to release the block 1 and the intermediate support 19 will thereafter be raised to the intercept position for acquiring the next book block to be transferred to the conveyor 2.

Referring again to FIG. 1, as they move downwardly at angle $\alpha_2$, the clamped book blocks 1 are maintained in a horizontal orientation by engagement of the trailing edges thereof with guide track 16. The horizontal orientation of the book blocks at the time of the transfer thereof to the intermediate support 19 is aided by a retractable support element 21 located at the downstream end of guide track 16. The movement of support element 21 into and out of engagement with a book block is under the control of a fluid actuator 22.

As will be appreciated by those skilled in the art, several products 1 can be accumulated on the intermediate support 19 prior to the transfer thereof to the in-feed conveyor 2. Thus, the intermediate support 19 may function in the manner of an elevator which descends in stepwise fashion.

In the disclosed embodiment, the printed products 1 discharged from the adhesive binding station are routed to a pair of trimming stations. Thus, a pair of delivery devices 7, 7' are serially positioned along the transport path defined by the fixed tray conveyor. The delivery devices 7 and 7' are separated by a specific distance but are located on the same horizontal level. A section of the fixed tray conveyor which moves generally upwardly, and is in part defined by a guide rail 17, is disposed intermediate the trimming stations. This upwardly extending conveyor path section is necessary to ensure that, when arriving at delivery device 7', the book-blocks will be horizontally oriented and moving downwardly at the same angle $\alpha_2$ as when received at delivery device 7. The delivery device 7' includes an intermediate support, indicated generally at 19', which is generally of the same configuration as intermediate support 19 of delivery device 7.

The delivery device 7' may, rather than be a part of the in-feed to a trimmer, be part of a temporary storage system on which products 1 may be accumulated for use in the case of a failure upstream of the apparatus depicted in FIG. 1 or in which product may be held for use in the case of a failure downstream of the apparatus depicted in FIG. 1.

After passing through the delivery device 7', the grippers 5 return to the transfer device 6. Should a gripper not be unloaded in either of the delivery devices 7 or 7', the transfer device 6 can accommodate this "failure" by causing an "empty cycle", i.e., by holding back an incoming product 1.

The present invention is not limited to use in the environment described above. Thus, for example, the invention may be employed for the in-line coupling of further processing stations of a binding machine and may also be used for the loading of book thread stitching machines with section stacks formed by an assembly machine.

As briefly noted above, the in-feed conveyors 2, 3 perform a storage function. In a typical operational mode, machine control will cause the delivery of products so as to maintain the desired degree of storage, i.e., the in-feed conveyors 2 and 3 function as buffers normally filled to a preselected percent of capacity. The printed product units formed on the "buffers" will typically be larger than the printed product units engaged by the grippers. Thus, products which are transported and subsequently released by the grippers will, in the course of operation of the present invention, typically be gathered into larger units which are then fed to the downstream work station. For example, in the case of a thread stitching machine, the stack heights which are formed on conveyors 2 and/or 3 will often be greater than the gripper limit. Accordingly, partial stacks are formed in an upstream assembly machine, transported to the in-feed of the downstream apparatus and restacked.

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. In a transport for conveying serially received printed products from an outfeed conveyor to a receiving station of a bookbinding machine, the transport including an endless conveyor having spacially separated gripping mechanisms for engaging the printed products, the endless conveyor defining a transport path which traverses at least two receiving stations, the improvement comprising:

means for presenting the products to be transported in serial fashion with leading edges presented in position for engagement by the gripping mechanisms, said presenting means orienting the products flat and synchronizing the movement thereof with the movement of the gripping mechanisms; and means for separating the transported products from the transport path for delivery to each of the receiving stations, said separating means selectively delivering the transported products to in-feed conveyors of the receiving stations.

2. The apparatus of claim 1 wherein said separating means each comprises:

buffer storage means for accumulating products separated from the transport path.

3. The apparatus of claim 1 wherein the transport path has an obliquely descending portion associated with each of said separating means and wherein said separating means each include:

means defining a retractable barrier for insertion into one of said descending path portions to separate a product from a gripping mechanism upon opening thereof:

movable intermediate support means for receiving and supporting separated products; and guide means for engaging and supporting the products during movement thereof on one of one of said descending path portions upstream of the location of said barrier defining means, said guide means cooperating with the products in a region thereof disposed oppositely with respect to the region of the products engaged by the gripping mechanisms.

4. The apparatus of claim 3 wherein said intermediate support means comprises:

a pair of cooperating support plates; and means for imparting vertical and horizontal motion to said plates whereby said plates can receive a separated product, lower the received product to a receiving conveyor and move apart to release the product to the receiving conveyor.

5. The apparatus of claim 3 wherein the transport path has an upwardly directed portion disposed between each of said separating means, said upwardly directed portion undergoing transitions from and to respective ones of said obliquely descending path portions.

6. In a transport for conveying serially received printed products from an outfeed conveyor to at least a first receiving station of a bookbinding machine, the transport including an endless conveyor having spacially separated gripping mechanisms for engaging the printed products, the endless conveyor defining a transport path, the improvement comprising:

transfer means for moving the products from the outfeed conveyor into registration with the gripping mechanisms, said transfer means presenting the products to be transported in serial fashion with leading edges located in position for engagement by the gripping mechanisms, said transfer means imparting a flat and horizontal orientation to the products, said transfer means synchronizing movement of the products with the movement of the gripping mechanisms; and means for separating the transported products from the transport path, said separating means delivering the products to at least a first receiving station.

7. The apparatus of claim 6 wherein the transport path has a first obliquely descending portion and wherein said transfer means is located in said first descending portion and said apparatus further comprises:

guide means for engaging products moving on said first obliquely descending transport path portion downstream of said transfer means, said guide means comprising a guide rail for maintaining the horizontal product orientation.

8. Apparatus for transferring serially received printed products from an outfeed conveyor to at least a first receiving station of a bookbinding machine, the printed products having plural edges and being characterized by sufficient rigidity to permit establishment of an overlapping mutually supporting relationship therebetween, said apparatus comprising:

an endless conveyor, said endless conveyor having a plurality of serially arranged and spacially separated gripping mechanisms for engaging the printed products, said endless conveyor defining a non-linear transport path which extends between the outfeed conveyor and a first receiving station, said gripping mechanisms moving continuously along said transport path, the spacing between adjacent of said gripping mechanisms and the orientation of at least a portion of said transport path causing products engaged by adjacent of said gripping mechanisms to be in a partially overlapping mutually supporting relationship during movement along said portion of said transport path;

means for presenting the printed products to be transported in serial fashion with first edges thereof located in position for engagement by said moving gripping mechanisms, said presenting means orienting the printed products flat and synchronizing the movement thereof with the movement of said gripping mechanisms; and means for separating the individual transported printed products from said endless conveyor defined transport path, said separating means delivering the printed products to at least a first receiving station.

9. The apparatus of claim 8 wherein said presenting means comprises:

transfer means for moving the products from the outfeed conveyor into registration with the gripping mechanisms, said transfer means imparting a horizontal orientation to the products.

10. The apparatus of claim 9 wherein the transport path has a first obliquely descending portion and wherein said transfer means is located in said first descending portion and said apparatus further comprises:

guide means for engaging products moving on said first obliquely descending transport path portion downstream of said transfer means, said guide means comprising a guide rail for maintaining the horizontal product orientation.

11. The apparatus of claim 8 wherein the transport path traverses at least two receiving stations and wherein said separating means includes:

means for selectively delivering the transported products to in-feed conveyors of the receiving stations.

12. The apparatus of claim 11 wherein said means for selectively delivering products each comprises:

buffer storage means for accumulating products separated from the transport path.

13. The apparatus of claim 11 wherein the transport path has an obliquely descending portion associated with each of said means for selectively delivering products and wherein said means for selectively delivering products each include:

means defining a retractable barrier for insertion into one of said descending path portions to separate a product from a gripping mechanism upon opening thereof:

movable intermediate support means for receiving and supporting separated products; and guide means for engaging and supporting the products during movement thereof on said one of said descending path portions upstream of the location of said barrier defining means, said guide means cooperating with the products in a region thereof disposed oppositely with respect to the region of the products engaged by the gripping mechanisms.

14. The apparatus of claim 13 wherein said intermediate support means comprises:

a pair of cooperating support plates; and means for imparting vertical and horizontal motion to said plates whereby said plates can receive a separated product, lower the received product to a receiving conveyor and move apart to release the product to the receiving conveyor.

15. The apparatus of claim 13 wherein the transport path has an upwardly directed portion disposed between each of said means for selectively delivering products, said upwardly directed portion undergoing transitions from and to respective ones of said obliquely descending path portions.

* * * * *